Sept. 29, 1936.  R. JOHNSON  2,055,725
MECHANICAL COAL STOKER
Filed Sept. 13, 1935
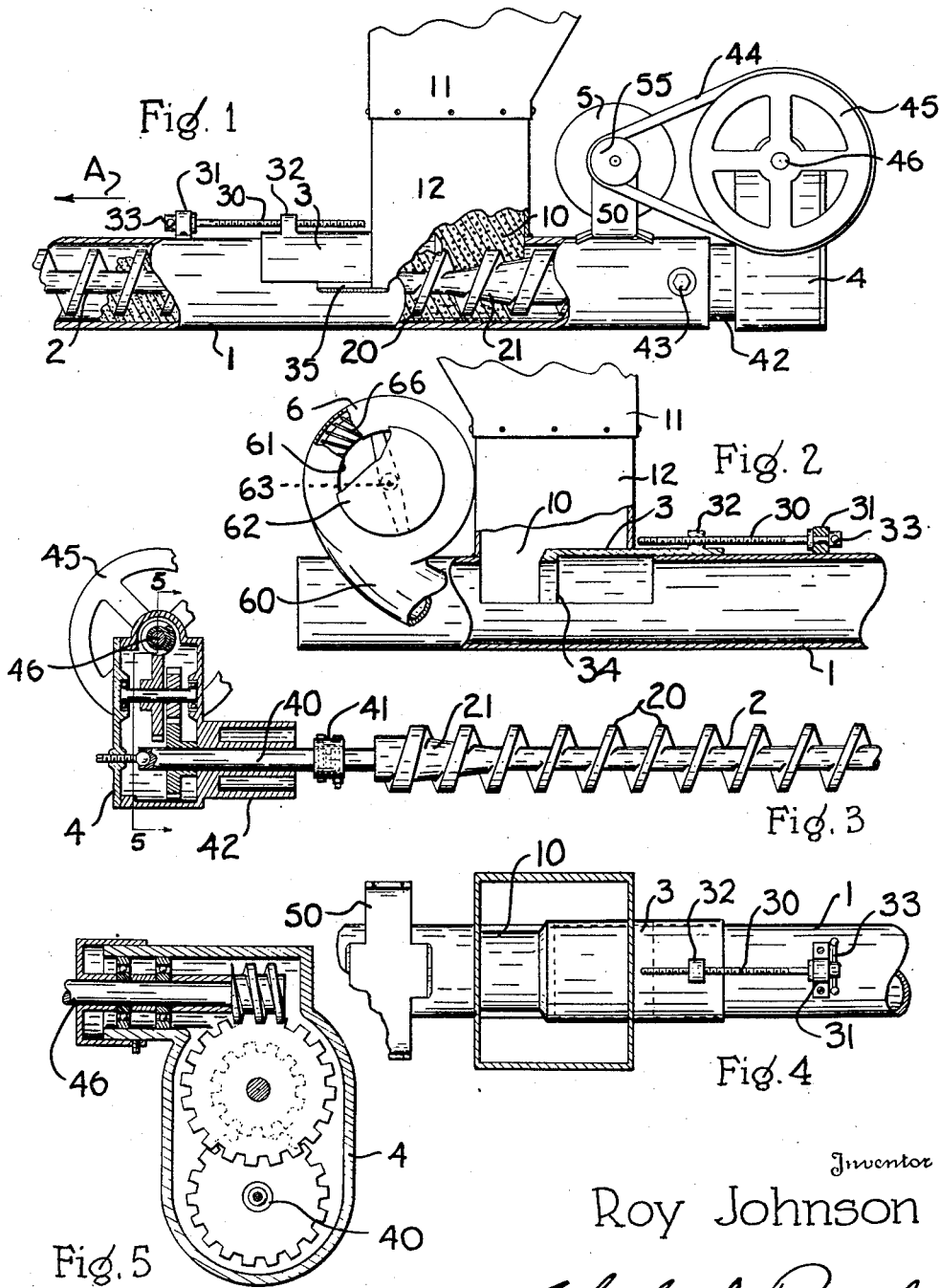
Inventor
Roy Johnson
By Charles L. Reynolds
Attorney Patented Sept. 29, 1936

2,055,725

UNITED STATES PATENT OFFICE 2,055,725

MECHANICAL COAL STOKER

Roy Johnson, Seattle, Wash.

Application September 13, 1935, Serial No. 40,423

7 Claims. (Cl. 198—64)

My invention relates to coal feeding devices, and is more particularly designed as a feeding device for domestic stokers, using granular coal.

Among the objects of my invention are: to provide a domestic stoker which may be cheaply manufactured; which is provided with means to automatically prevent clogging and to vary the rate of feed of the coal as desired; which can be readily dismounted and the feed screw removed to break a jam or to clear away any clogging, even though the hopper may be filled, and without the necessity of emptying the hopper; and which is simple throughout and convenient to assemble and to adjust.

My invention comprises the novel parts, and the novel assembly and arrangement of these parts relative to each other, as shown in the accompanying drawing, and as will be described in this specification and more particularly pointed out by the claims which terminate the same.

In the accompanying drawing I have shown my invention embodied in a stoker of the type and design now preferred by me, it being understood, however, that various changes may be made in the form, proportions, and arrangement of parts without departing from the spirit of my invention as defined by the claims.

Figure 1 is a side elevation of the feed arrangement, the parts being broken away and shown in section.

Figure 2 is a similar elevation from the opposite side, the gear box and feed screw being removed, and parts being shown in section.

Figure 3 is a sectional view through the gear box, showing it associated with the feed screw, and this view complements Figure 2.

Figure 4 is an elevation of the feed device, with the motor and all associated parts removed, and with the hopper throat shown in section.

Figure 5 is a transverse section through the gear box, substantially on the line 5—5 of Figure 3.

The feed pipe 1 is or may be an ordinary pipe, preferably of uniform diameter throughout. Coal is advanced from its outer end toward its inner end for delivery to a suitable burner (not shown) in a direction indicated by the arrow A. Inside of its outer end it is provided with a feed opening 10 in its upper side, and a hopper 11 provided with a throat 12 is mounted directly on the pipe 1 in registry with the feed opening 10.

A feed screw 2 is received in the pipe 1, being insertable through its outer end. This feed screw is provided with a helical thread 20, which is approximately of a size to fill the inside diameter of the tube 1, though some clearance should be left. Its inner end is unsupported and in effect it rests upon the bottom of the pipe 1, although it will ordinarily ride somewhat on the coal which is within the pipe. This feed screw is provided with a central core, and from a point at or outside of the outer end of the feed opening 10, the core tapers downward from a maximum diameter at this point to a minimum diameter at or near the inner end of the feed opening 10. This tapered portion is indicated at 21. Means, to be later described, are provided for rotating the feed screw in a direction to advance the coal in the pipe toward the inner end.

Cooperating with the feed opening 10 and the tapered portion 21 of the feed screw is a gate 3. Preferably this is a piece of metal of a shape to fit the outside of the pipe 1, and rests and slides upon this pipe. Guides 35 support it and hold it in proper alignment. The inner wall of the hopper throat 12 is slotted, closely adjacent its junction with the pipe 1, as is best seen in Figure 2, for the projection of the gate 3 over the feed opening 10, and the gate 3 is adjustable from the inner end of the feed opening 10 toward the latter's outer end. Such adjustment is conveniently accomplished by an adjusting screw 30 swiveled in a lug 31 secured upon the pipe, and threadedly received in a lug 32 carried by the gate 3. The screw may be rotated by a handle 33, slidably received in the end of the screw, which handle purposely is placed closely adjacent the pipe 1 so that it may not be casually adjusted, but yet can be adjusted when required. Preferably also, the gate is provided with a flange 34, as best seen in Figure 2, which reinforces the end of the gate, and which, being of a shape and curvature substantially coinciding with the inside of the pipe, insures that any coal passing between it and the feed screw is not greater in volume than the capacity of the pipe, hence will not jam nor clog the pipe.

It will now become apparent that the gate 3 may be adjusted lengthwise of the feed opening in cooperation with the tapered portion 21 of the feed screw, and that by such adjustment, not only is the effective area of the feed opening adjusted, but also the effective depth of the valley of the feed screw is adjusted, and that the feed screw in substantially all adjusted positions of the gate will have increased depth inwardly of the edge of the gate, so that any mass of coal which will pass beneath the edge of the gate 3 will clear itself beyond that point, and no piece larger than the space between the cylindrical core of the feed screw and the pipe can pass into the pipe. Thus it is automatically insured that there will be no clogging in the inner end of the pipe, or between the pipe and the feed screw.

The feed screw is conveniently driven from a gear box 4, having a shaft 40 coupled by removable coupling means 41 to the outer end of the feed screw, the gear box also having a sleeve 42 which is telescopically received in the outer end of the pipe 2. It may be supported therein by means such as the set screw 43 (see Figure 1), and this permits the belt 44, connecting the drive wheel 45 on shaft 46 of the gear box and the drive pulley 55 of a motor 5 mounted on the pipe, to be tightened as desired.

The motor 5 is mounted in a bracket 50 which is secured directly upon the outer end of the pipe 1, and the motor may be of a type which incorporates a resilient mounting between itself and the bracket 50. The belt drive permits ready disengagement of the gear box from the motor, and upon removal of the set screw 43, the gear box may be removed, drawing with it the feed screw 2. If the hopper is filled, communication between the hopper and the pipe may be cut off by closing the gate 3, hence the only coal which needs to be removed is that which is within the pipe 1.

It is desirable to employ an air draft with such stokers, and to that end I may mount a fan housing 6 upon the bracket 50, or otherwise upon the outer end of the pipe 1, in alignment with the motor, the fan 66 within the housing 6 being directly coupled to the motor shaft. An air feed conduit 60 leads to the burner (not shown). The fan housing is provided with an inlet opening 61 in one side, and a plate 62 having a bolt 63 threadedly received in the fan housing 6 may be adjusted inwardly or outwardly of the fan housing to vary the effective area of the air inlet opening, thus constituting a simple, yet effective, means of adjusting the amount of air delivered.

What I claim as my invention is:

1. A device for feeding granular coal to stokers, comprising a pipe of uniform diameter, having a feed opening in its side, means delivering coal through such feed opening to the pipe, and a feed screw disposed in said pipe and extending lengthwise beneath and beyond the feed opening, said screw having a helical thread and a central core tapering from a maximum at one side of such opening to a lesser size at the other side thereof, and rotatable in a direction to advance coal in the direction of the lesser size of said core, and a gate disposed substantially in the periphery of the pipe, and movable relative to the feed opening to vary the effective depth of thread on the tapered core, exposed to coal delivered through the feed opening.

2. A device for feeding granular coal to stokers, comprising a pipe of uniform diameter, having a feed opening in its side, means delivering coal through such feed opening to the pipe, a feed screw disposed in said pipe and extending lengthwise beneath and beyond the feed opening, said screw having a helical thread and a central core tapering from a maximum at one side of such opening to a lesser size at the other side thereof, and rotatable in a direction to advance coal in the direction of the lesser size of said core, and means movable from the latter end of the feed opening, lengthwise of the latter, to vary its effective size, and cooperating with the tapered core to restrict the effective volume of coal delivered into and through the pipe.

3. A device for feeding granular coal to stokers, comprising a pipe of uniform diameter adapted for advance of coal from its outer end towards its inner end, and having a feed opening in its upper side, a hopper thereabove delivering coal through such opening into the pipe, a feed screw disposed in said pipe and having a helical thread of approximately the inside diameter of the pipe, the central core of said feed screw being tapered from a minimum diameter, inside the pipe from the feed opening, to a greater diameter beyond the outer end of the feed opening, and a gate having an edge disposed in the feed opening and coinciding in size and curvature to the inside diameter of the pipe, said gate being slidable lengthwise of the pipe from the inner end of the feed opening, such edge cooperating with the edges of the feed opening to vary the effective size of the latter, and cooperating with the tapered core to vary the effective depth of the valley of the feed screw immediately beneath the feed opening.

4. A coal feeding device for stokers, comprising a pipe of uniform diameter adapted for advance of coal from its outer end towards its inner end, and having a feed opening in its upper side, a hopper thereabove delivering coal through such opening into the pipe, said hopper, closely adjacent the inner end of the feed opening, being slotted, a gate of curvature conforming to, and slidably mounted on, the pipe, and projecting through said slot, means to adjust the spacing between the outer end of said gate and the inner end of the feed opening, to vary the effective length of such opening, a feed screw having a helical thread of approximately the inside diameter of the pipe, and a central core tapering down, beneath the feed opening, from a maximum at the outer end of the latter to a minimum at its inner end, said gate cooperating with said tapered core to vary the effective depth of the valley of the feed screw immediately beneath the feed opening, and means to rotate said feed screw in a direction to advance the coal towards the inner end of said pipe.

5. A coal feeding device for stokers, comprising a feed pipe, a hopper delivering coal thereinto, a feed screw in the pipe rotatable to advance coal towards its inner end, drive means for said feed screw including a motor mounted on the feed pipe, a gear box having a sleeve receivable in the outer end of the pipe, a shaft in the gear box aligned with the feed screw, a coupling connecting the shaft and feed screw, a belt connecting the motor and gear box, and releasable means to retain the sleeve engaged in the pipe in any desired position, whereby the belt may be tightened at will.

6. A coal feeding device for stokers, comprising a feed pipe, a hopper delivering coal thereinto, a feed screw in the pipe rotatable to advance coal towards its inner end, drive means for said feed screw including a motor directly mounted on the outer end of the pipe, a gear box having a sleeve telescopically received in the outer end of the pipe and operatively connected to the feed screw, and a belt connecting the motor and gear box.

7. A coal feeding device for stokers, comprising a feed pipe, a hopper delivering coal thereinto, a feed screw in the pipe rotatable to advance coal towards its inner end, drive means for said feed screw including a motor directly mounted on the outer end of the pipe, a gear box having a sleeve telescopically received in the outer end of the pipe and operatively connected to the feed screw, a belt connecting the motor and gear box, a fan mounted on the motor shaft, and a fan housing and air conduit mounted on the outer end of the pipe.

ROY JOHNSON.